United States Patent
Hayakawa et al.

(10) Patent No.: US 7,985,473 B2
(45) Date of Patent: Jul. 26, 2011

(54) RESINOUS-SUBSTANCE-IMPREGNATED PLANAR PAPER AND ADHESIVE TAPE USING THE SAME

(75) Inventors: Tomohiro Hayakawa, Okayama (JP); Hideo Hayashi, Okayama (JP); Masatoshi Takenoiri, Okayama (JP); Toshimitsu Harada, Okayama (JP)

(73) Assignee: Kuraray Co., Ltd., Kurashiki-shi (JP)

(*) Notice: Subject to any disclaimer, the term of this patent is extended or adjusted under 35 U.S.C. 154(b) by 0 days.

(21) Appl. No.: 12/629,973

(22) Filed: Dec. 3, 2009

(65) Prior Publication Data
US 2010/0080988 A1 Apr. 1, 2010

Related U.S. Application Data

(63) Continuation of application No. PCT/JP2008/053504, filed on Feb. 28, 2008.

(30) Foreign Application Priority Data

Jun. 7, 2007 (JP) .................. 2007-151062
Sep. 12, 2007 (JP) .................. 2007-236323

(51) Int. Cl.
*D04H 1/00* (2006.01)
*D04H 3/00* (2006.01)
*D04H 5/00* (2006.01)
*D04H 13/00* (2006.01)

(52) U.S. Cl. ........ 428/343; 442/335; 442/334; 442/327; 442/337; 442/402

(58) Field of Classification Search .................. 428/343; 442/335, 334, 327, 337, 402
See application file for complete search history.

(56) References Cited

U.S. PATENT DOCUMENTS

| | | | | |
|---|---|---|---|---|
| 6,319,601 B1* | 11/2001 | Ise et al. | .......... | 428/364 |
| 2004/0180597 A1* | 9/2004 | Kamada et al. | ............... | 442/335 |
| 2004/0198866 A1* | 10/2004 | Sasaki | ............ | 523/152 |
| 2005/0121444 A1* | 6/2005 | Trochlil | .......... | 219/730 |
| 2007/0172687 A1* | 7/2007 | Martin-Portugues et al. | ........... | 428/531 |

FOREIGN PATENT DOCUMENTS

CN 1299427 A 6/2001

(Continued)

OTHER PUBLICATIONS

Machine translation 1999-323789 (1999).*

(Continued)

*Primary Examiner* — Callie E Shosho
*Assistant Examiner* — Samir Shah
(74) *Attorney, Agent, or Firm* — Oblon, Spivak, McClelland, Maier & Neustadt, L.L.P.

(57) ABSTRACT

Provided is a planar paper for an adhesive tape, and an adhesive tape utilizing such planar paper as a backing, which has an elongation sufficient to allow the adhesive tape to be favorably adhered to an adherend surface without being accompanied by any lift and separation, but with consistently conforming to the curved surfaces and/or the rough surfaces; which is capable of providing a clear painting line left in a portion of a painted layer required in automobiles; which is capable of being easily cut by hand without requiring any tool as a blade; and which is also excellent in handleability. The planar paper comprises a polyvinyl alcohol-series fiber having a fiber breaking temperature in water of 92 to 125° C., a tenacity of 0.5 to 3.5 cN/dtex at 10% elongation, and a breaking elongation of 17 to 60%.

8 Claims, 4 Drawing Sheets

FOREIGN PATENT DOCUMENTS

| | | |
|---|---|---|
| JP | 02-151427 | 6/1990 |
| JP | 03-137291 | 6/1991 |
| JP | 03-137292 | 6/1991 |
| JP | 07-080367 | 3/1995 |
| JP | 11-323789 | 11/1999 |
| JP | 1999323789 | * 11/1999 |
| JP | 2001-079971 | 3/2001 |
| JP | 2001-192930 | 7/2001 |
| JP | 2001226894 | * 8/2001 |
| JP | 2002-012839 | 1/2002 |
| JP | 2002161430 | * 6/2002 |
| JP | 2002-275728 | 9/2002 |
| JP | 2002-327399 | 11/2002 |
| JP | 2004-036028 | 2/2004 |
| WO | 99-57372 | 11/1999 |
| WO | WO 01/87367 | 11/2001 |
| WO | WO2005118718 | * 12/2005 |

OTHER PUBLICATIONS

Machine translation 2001-226894 (2001).*
Machine translation 2002-161430 (2002).*
Office Action issued Aug. 27, 2010, in Chinese Patent Application No. 200880018915.8 ( with partial English translation).
Extended European Search Report issued Feb. 23, 2011, in Application No./Patent No. 08720997.9-2124/2159321 PCT/JP2008053504.

* cited by examiner

RESINOUS-SUBSTANCE-IMPREGNATED PLANAR PAPER AND ADHESIVE TAPE USING THE SAME

CROSS REFERENCE TO RELATED APPLICATIONS

This application is a continuation application, under 35 U.S.C. §111(a), of international application No. PCT/JP2008/053504, filed Feb. 28, 2008, which claims priority to Japanese Patent Application No. 2007-151062, filed Jun. 7, 2007, and Japanese Patent Application No. 2007-236323, filed Sep. 12, 2007, the disclosures of which are incorporated by reference in their entirety into this application.

FIELD OF THE INVENTION

The present invention relates to the field of planar papers used as a backing for adhesive tapes, and to the field of adhesive tapes comprising such planar paper as the backing.

BACKGROUND ART

Adhesive tapes made with planar papers have been known as a tape comprising a resinous-substance-impregnated planar paper as a backing and an adhesive layer on the paper. Such adhesive tapes are required to be adhered to an adherend surface favorably without being accompanied by any lift and separation, but with consistently conforming to the curved surface area and/or the rough surface area in such adherend surface, when the adhesive tapes are used as a paint masking or a masking for curing a rough surface, in fixing electronic component parts or in any other application.

In recent years, in the automotive industry where the recent mode of automotives frequently employs curved shapes, the adhesive tapes for paint masking used in the production process of the automotives are further required not only to have a good conformability to the curved surfaces to be adhered but also to provide a clear painting line left in a portion of a painted surface.

Conventional planar papers for adhesive tapes as the backings have been mainly made of natural pulps having celluloses as a base component, such as wood pulps, hemp pulps, linter pulps and the like. In addition, in some cases, synthetic fibers are used in order to improve elongation or strength characteristics required for tapes. In such cases, polyester fibers or polyolefinic fibers are found to be a candidate as the synthetic fibers (for example, see Patent Document 1). However, these fibers are incompatible to resins which are used for impregnation into the papers, and sometimes adversely affect the obtained tape characteristics.

On the other hand, in view of affinity to resins, polyvinyl alcohol fibers have been favorably used because of their good compatibility to the resins (for example, see Patent Documents 2 and 3). The polyvinyl alcohol fibers have an improved affinity to resins, and thereby the elongation and strength characteristics of the adhesive tapes are improved by using the polyvinyl alcohol fibers. However, the conventional polyvinyl alcohol fibers cannot impart enough elongation to the adhesive tapes. Thus, even if the adhesive tapes comprising such polyvinyl alcohol fibers have conformability to gently curved lines, the adhesive tapes cannot sufficiently conform to a non-gentle curved line required in the production process of the automotives.

Further, there have been known that some crepe papers with crinkle texture are used for adhesive tapes, and that the obtained adhesive tapes have a good conformability to adherend surfaces. For example, some crepe papers having a high elongation characteristic and made from natural pulps having cellulose as a base component, for example, wood pulps, hemp pulps, or linter pulps, or a mixture of the above-mentioned natural pulps and synthetic fibers have been developed (for example, see Patent Documents 4 and 5). The adhesive tapes made with such crepe paper as the backing surely satisfies the conformability to adherend surfaces, however, wrinkles of the crepe paper cause blur of the painting, and it is impossible to obtain clear painting lines.

On the other hand, in the case where tapes are required only to provide clear painting lines after removing the adhesive tape from the painted surface, some conventional adhesive tapes are useful which comprise a resinous-substance-impregnated planar paper made from natural pulps with the addition of synthetic fibers. However, such adhesive tapes have low elongation and deteriorate in the conformable feature, and therefore they have been inapplicable to curved lines.

Further, some adhesive tapes made with a plastic film as the backing have been also examined, but they have not been easy to cut by hand because of their high tear strength. Such tapes need to cut by manually pulling them against cutting tools such as blades, and it is assumed that all of these tapes deteriorate in handleability.

Patent Document 1: Japanese Laid-open Patent Publication No. 3-137292
Patent Document 2: Japanese Laid-open Patent Publication No. 7-80367
Patent Document 3: Japanese Laid-open Patent Publication No. 2004-036028
Patent Document 4: Japanese Laid-open Patent Publication No. 2002-012839
Patent Document 5: Japanese Laid-open Patent Publication No. 2002-327399

DISCLOSURE OF THE INVENTION

The Problems to be Solved by the Invention

In view of the foregoing problems and inconveniences, the present invention has for its object to provide a planar paper for an adhesive tape, and an adhesive tape utilizing such planar paper as a base material or a backing. The planar paper has an elongation sufficient to allow the adhesive tape to be favorably adhered to an adherend surface without being accompanied by any lift and separation, but with consistently conforming to the curved line area and/or the rough surface area in such adherend surface when such adhesive tape is used as a paint masking or a masking for curing a rough surface, in fixing electronic component parts or in any other application. Also, the adhesive tape is capable of providing a clear painting line left in a portion of a painted layer, as required in automobiles, when the adhesive tape is removed from such portion of the painted layer. Further, the adhesive tape is capable of being easily cut by hand without requiring any tool such as, for example, a blade, and therefore is excellent in handleability.

Means of Solving the Problems

In order to accomplish the foregoing object of the present invention, the inventors of the present invention have extensively studied various planar papers, which form a base material for an adhesive tape, and fibers forming such planar papers. As a result, it has been found that when polyvinyl alcohol-series fibers having a good affinity with a resinous substance is employed and the polyvinyl alcohol-series fibers are further designed to have "a higher elongation and a lower modulus" than those of fibers that have been generally utilized, an adhesive tape excellent in stretching property and having a high degree of elongation can be obtained. It also has been found (i) that the resultant adhesive tape being excellent in stretching property and having a high degree of elongation can be favorably adhered to a surface to be applied which has twists and turns and/or rough surfaces by following the shape of the twists and turns and/or the rough surfaces, (ii) that such adhesive tape in a form of a planar paper is free from weeping which is frequently observed in a crepe paper-based adhesive tape, and (iii) that the adhesive tape can provide a clear painting line left in a portion of a painted layer when the adhesive tape is removed from such portion of the painted layer.

That is, the present invention provides a resinous-substance-impregnated planar paper which comprises a polyvinyl alcohol-series fiber having a fiber breaking temperature in water (by dissolution) of 92 to 125° C., a tenacity of 0.5 to 3.5 cN/dtex at 10% elongation, and a breaking elongation of 17 to 60%. The planar paper preferably comprises the polyvinyl alcohol-series fiber having a single-fiber fineness of 0.5 to 3.0 dtex, a fiber length of 2.5 to 12.0 mm, and a breaking tenacity of 2 to 7 cN/dtex. The planar paper more preferably comprises the polyvinyl alcohol-series fiber extruded from a spinneret hole at an extrusion rate of 0.015 to 0.040 cc/min for fiber formation, and followed by dry hot-drawing at a draw ratio of 1.0 to 1.5 times. The planar paper further preferably comprises the above-mentioned polyvinyl alcohol-series fiber at a proportion of 7 to 50 mass % relative to 100 mass % of the planar paper.

The planar paper according to the present invention preferably comprises a natural pulp blended as a subject fiber with the above-mentioned polyvinyl alcohol-series fiber. The present invention also provides an adhesive tape comprising a backing, the backing comprising the planar paper.

Effect of the Invention

According to the present invention, provided are a planar paper for an adhesive tape, and an adhesive tape utilizing such planar paper as a backing, which has an elongation sufficient to allow the adhesive tape to be favorably adhered to an adherend surface without being accompanied by any lift and separation, but with consistently conforming to the curved line area and/or the rough surface area in such adherend surface when such adhesive tape is used as a paint masking or a masking for curing a rough surface, in fixing electronic component parts or in any other application; which is capable of providing a clear painting line left in a portion of a painted layer, as required in automobiles, when the adhesive tape is removed from such portion of the painted layer; which is capable of being easily cut by hand without requiring any tool such as, for example, a blade; and which is excellent in handleability.

BEST MODE FOR CARRYING OUT THE INVENTION

A preferred embodiment of the present invention will now be described in more detail. The planar paper of the present invention, used as a backing for adhesive tapes, is obtained by impregnating a paper with a resinous substance.

The adhesive tape defined in the present invention gives a generic name for products with an adhesive property which comprises a tape-type or sheet-type backing and an adhesive layer coated to the backing.

The polyvinyl alcohol (hereinafter, referred to as "PVA")-series fiber used in the present invention should have a lower modulus than commonly used PVA-series fibers do because the adhesive tape obtained in the present invention which comprises the present PVA-series fiber should satisfy an appropriate elongation feature when it is used. Tenacity at 10% elongation indicates whether the fiber has a lower modulus. Specifically, the fibers used in the present invention needs to have a tenacity of 0.5 to 3.5 cN/dtex at 10% elongation, and it preferably has a tenacity of 0.8 to 3.3 cN/dtex at 10% elongation, more preferably has a tenacity of 1.0 to 3.0 cN/dtex at 10% elongation. In the case where the fiber has a tenacity of lower than 0.5 cN/dtex at 10% elongation, such fiber cannot contribute to high strength of the adhesive tape as a structural member, resulting in too-easy tearing of the adhesive tape at the time of applying it to a surface to be applied. On the other hand, in the case where the adhesive tape comprises a fiber having a tenacity of higher than 3.5 cN/dtex at 10% elongation, such adhesive tape needs an excessive power in order to realize an appropriate elongation to conform to curved lines, resulting in deterioration in handleability.

Moreover, the PVA-series fiber used in the present invention needs to have an higher breaking elongation. More concretely, the fiber needs to have a breaking elongation of 17 to 60%, preferably has an 20% to 58% and more preferably 22% to 55%. If the fiber has a breaking elongation of lower than 17%, the adhesive tape comprising such fiber has an insufficient conformable feature to the curved lines due to a lower elongation. In contrast, if the fiber has a breaking elongation of over 60%, the adhesive tape comprising such fiber has too high elongation, and cannot realize the required clear visible lines because of the warped tape in the width direction.

The PVA-series fibers employed in the practice of the present invention must retain a fibrous structure under the wet heat treatment. To "retain the fibrous structure under the wet heat treatment" referred to herein means that the PVA-series fibers in the paper which is impregnated with a resinous substance dissolved or dispersed in a solvent retain their fibrous structure during the heat treatment employed at the time of removal of the solvent. In the practice of the present invention, the fibrous morphology is substantially remained other than only the fibrous surface is dissolved under this wet heat treatment, and the fibers are bonded together at fiber crossing points to form a quasi network structure within the resinous substance. As a result, increase in elongation and tensile strength of the adhesive tape is enhanced while increase in tear strength of the adhesive tape is inhibited.

Whether or not the PVA-series fibers can retain the fibrous structure under the condition of the wet heat treatment can be determined by measuring the fiber breaking temperature in water. In order for the fibrous structure to be retained in the PVA-series fibers under the condition of the wet heat treatment as specifically shown in FIG. 1, the fiber breaking temperature in water is required to be within the range of 92 to 125° C., preferably within the range of 93 to 122° C. and more preferably within the range of 95 to 120° C. If the fiber breaking temperature in water is lower than 92° C., the fibrous shape is no longer remained during the wet heat treatment and the PVA-series fibers will be completely dissolved, failing to impart a desired degree of elongation to the planar paper. Conversely, if the fiber breaking temperature in water exceeds 125° C., not only is the hydrophilic nature of the PVA-series fibers reduced considerably, but also a spot-bonding at fiber crossing points (intersection) based on dissolving of only surfaces of the PVA-series fiber does not arise. Therefore, the bondability between fibers and the impregnated resin in the resultant adhesive tape will be reduced to such an extent that neither the elongation nor the strength of the tapes can be increased. Further, such bondability will cause reduced stress concentration, resulting in increasing the tearing force of the tape, and the easiness to cut by hand (hereinafter, referred to as the hand cutting property) will be reduced, and therefore the handleability will be deteriorated.

Figure 1:
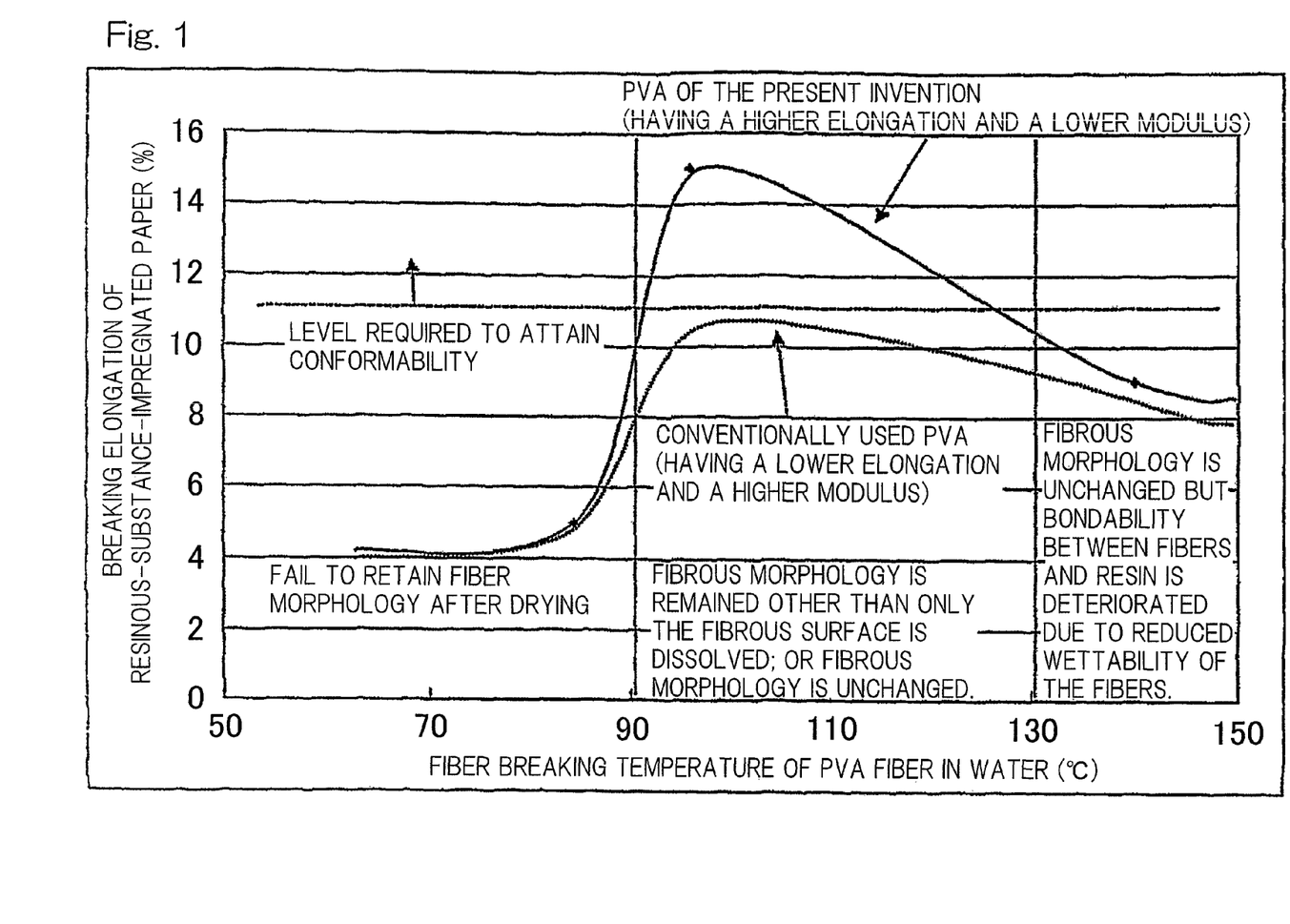
FIG. 1 is a graph showing a relationship between fiber breaking temperatures of PVA fibers in water and breaking elongations of resinous-substance-impregnated papers comprising the PVA fibers.

The PVA-series fiber used in the present invention must have, as shown in FIG. 1, "a higher elongation and a lower modulus" different from those of fibers that have been conventionally utilized. In the conventional spinning method, a dope for PVA-series fibers is extruded at a higher extrusion rate from the spinning nozzle from the viewpoint of productivity, and then the formed filaments are drawn at a higher draw ratio during a dry heat treatment after spinning to attain a sufficient strength of the fiber. In this case, thus obtained PVA-series fiber has "a lower elongation and a higher modulus" even if the fiber has a fiber breaking temperature of 92 to 125° C. in water.

Further, some conventional PVA-series fibers have been known as being soluble in the wet heat condition to fail to retain their fiber morphology. Such fibers have a fiber breaking temperature of lower than 92° C. in water and have been used for the binder application. However, these fibers need to be avoided from dry heat treatment in order to retain their solubility.

On the contrary, the method for producing the PVA-series fiber in the present invention is different from the conventional ones. The present method needs, as described in detail later, a reduced extrusion rate from the spinning nozzle at the spinning, and further needs a drawing step after spinning which comprises setting a draw ratio as low as possible under a dry heat condition in order to produce PVA-series fiber having a higher elongation and a lower modulus.

The spinning method for the PVA-series fiber in the present invention is not limited to a specific one, and may include dry spinning, wet spinning, dry wet spinning and others. Among them, the wet spinning is preferably employed from the viewpoint of productivity and higher quality of the PVA-series fibers.

In general, there are two types of wet spinning methods. One is a water-based wet spinning method (a wet spinning using water as a solvent) and the other method is an organic solvent-based wet spinning method (a wet spinning using an organic solvent), and either methods are applicable for fiber formation. The water-based wet spinning method comprises preparing an aqueous spinning solution of a PVA-series polymer by dissolving the polymer in water, and extruding the spinning solution from spinneret holes into a coagulation bath of an aqueous salt solution for fiber formation. The organic solvent-based wet spinning method comprises preparing an organic spinning solution of a PVA-series polymer by dissolving the polymer in an organic solvent, and extruding the spinning solution from spinneret holes into a solidification bath of an organic solution for fiber formation.

Among them, the precise method of water-based wet spinning is now described in detail. In the first place, a spinning solution of a PVA-series polymer is prepared by dissolving the PVA-series polymer in water. The degree of polymerization of the PVA-series polymer used in the present invention is not especially restricted, and the PVA-series polymer generally has a degree of polymerization of 500 to 4,000, preferably a degree of polymerization of 1,000 to 2,500. In the case where the PVA-series polymer has a degree of polymerization of less than 500, mutual entangle of the molecular chains will be decreased, and the fiber comprising such polymer sometimes cannot attain a sufficient drawability at drawing process and deteriorates in fiber properties such as tenacity and water resistance. On the other hand, if the PVA-series polymer has a degree of polymerization of more than 4,000, the viscosity of the spinning solution increases too highly. In such a case, the concentration of the PVA-series polymer in the spinning solution should be reduced to decrease the viscosity, and therefore makes the productivity poor.

The PVA-series polymer used in the present invention is not especially limited to a specific one, and for example, may be copolymerized with at least one kind of copolymerizable monomers having a group such as carboxylic acid group, sulfonic acid group, ethylene group, silane group, silanol group, amine group, ammonium group, and others. Moreover, the saponification degree of the PVA is not also limited to a specific degree, and the saponification degree of the PVA-series polymer may be within the range between 85 mol % and 99.9 mol %, preferably between 96 mol % and 99.9 mol %.

Then, the prepared spinning solution is extruded from the spinneret. The present invention, different from the method to produce the conventional PVA-series fibers, should employ a spinning method to decrease the extrusion rate as slow as possible at the initial stage of the spinning operation in order to make the draw ratio in dry hot-drawing of not higher than 1.5 times. The extrusion rate may be preferably 0.015 to 0.040 cc/min, and more preferably 0.020 to 0.030 cc/min. If the extrusion rate exceeds 0.040 cc/min, the obtained fiber after drawing process may have a too large diameter. Then, the planar papers as well as adhesive tapes comprising such fiber may have a small number of constituent fibers in their sheet, failing to attain a desirable conformable feature. On the other hand, if the extrusion rate may be lower than 0.015 cc/min, the stability of the spinning step is decreased and the filament breakage sometimes occurs at the spinning process. As a result, PVA-series fibers cannot be stably produced.

Then, the spinning solution is extruded into a saturated aqueous solution of sodium sulfate, taken up with a first roller and subjected to wet hot-drawing at a draw ratio of 3 to 4 times in a water-retaining condition. The drawn filaments are dried keeping the fiber length at a predetermined one at a temperature of 130° C. in a hot air drier, and subjected to dry hot-drawing in a hot stove at a temperature of 200 to 250° C. In the conventional PVA-series fiber production process, the PVA-series fibers are made by dry hot-drawing at a draw ratio of over 1.8 times, and thus obtained PVA-series fiber has "a lower elongation and a higher modulus". On the contrary, the PVA-series fiber in the present invention is made by dry hot-drawing at a draw ratio of lower than 1.5 times under optimized heat treatment temperature. As a result, the PVA-series fiber in the present invention attains "a higher elongation and a lower modulus" which is the important feature of the present invention. More concretely, the draw ratio is preferably 1 to 1.5 times, more preferably 1 to 1.3 times, and further preferably 1 to 1.2 times. When the draw ratio exceeds 1.5 times, the resultant fiber has an excessively high modulus. Such fiber cannot contribute to desired conformable feature. In contrast, if the draw ratio is lower than 1 time or minus draft ratio, the fiber breakages will occur in the dry hot-drawing process. As a result, PVA-series fibers cannot be stably produced. It should be noted that, in the present invention, the PVA-series fiber produced by the above-mentioned spinning and drawing processes can be used for the planer tape without further treatments. Further, the PVA-series fiber can be also used after improving its water resistance by intramolecular cross-linking treatment such as formalization or by intermolecular cross-linking treatment with di-aldehydes capable of forming ether linkage subsequent to the hot-drawing, to a degree of adversely affecting its bonding property to other resins. If the dry heat treatment is not conducted, the resultant fiber has a fiber breaking temperature of lower than 92° C. in water. Accordingly, such fiber cannot be used as the desirable PVA-series fiber in the present invention and used for the binder application as previously described in the conventional PVA-series fibers.

Further, the PVA-series fiber used in the present invention preferably has a breaking tenacity of 2 to 7 cN/dtex, more preferably of 3 to 6 cN/dtex. If the fiber has a breaking tenacity of lower than 2 cN/dtex, the adhesive tape comprising such fiber sometimes easily breaks in usage. In contrast, if the fiber has a breaking tenacity of higher than 7 cN/dtex, the adhesive tape comprising such fiber needs a higher tensile strength at the time of elongation, and sometimes fails to conform to curved lines.

The PVA-series fiber used in the present invention is preferably used in the form of short fiber for making papers. The fiber length is preferably 2.5 to 12.0 mm, and more preferably 3.0 to 10.0 mm in view of good formability of non-woven fabric and avoidance of fall-out of fibers in usage. When the fiber length is over 12.0 mm, such long fibers may entangle with each other, and sometimes deteriorate in uniform paper formation in the paper making. The other hand, the fibers having a fiber length of less than 2.5 mm sometimes fail to form a network structure between fibers, and the adhesive tape comprising such fibers may deteriorate in the elongation and strength properties.

Further, the fiber preferably has a single-fiber fineness of 0.5 to 3.0 dtex. The fibers having a single-fiber fineness of smaller than 0.5 dtex may entangle between fibers too heavily because of a low aspect ratio of fibers, and may cause a non-uniform sheet formation at the sheet making process. On the other hand, the fibers having a single-fiber fineness of over 3 dtex may be also difficult to form a network structure between fibers because of decrease in the number of constitutional fibers, and it may be difficult to obtain a desired elongation property of the adhesive tape comprising such fibers. The single-fiber fineness of the fiber may be preferably 0.7 to 2.7 dtex, and more preferably 1.0 to 2.5 dtex.

With thus obtained PVA-series fiber, wet-laid non-woven fabrics can be produced in the following manner. For example, PVA-series fibers are first cut to have a fiber length of 6 mm, and then the cut fibers are used for paper making after defiberisation treatment. In the paper making procedure, the PVA-series fibers and natural pulps are mainly used as the fibers to be used, and the natural pulps preferably are blended as a subject fiber in the mixed paper making. The species of natural pulps is not limited to a specific one, and may include any natural pulps utilized in the paper making process, for example softwood pulps, hardwood pulps, esparto pulps, Manila hemp pulps, sisal hemp pulps, cotton linter pulps, kenaf pulps, bagasse pulps, straw pulps, and others. These pulps may be used singly or in combination. Further, these pulps may be mercerized by a conventional method.

It should be noted that, the natural pulps used in the present invention may include virgin pulps, wastepaper pulps, or a mixture of virgin pulps and wastepaper pulps. As the wastepaper pulps, there will be exemplified a variety of pulps having a longer fiber length obtained from, for example, milk cartons, waste diapers, wrapping papers and the like. Further, the non-woven fabric may include, as additional fibers, rayons, polynosics, solvent-spun cellulose fibers, acetate fibers, polyester fibers, nylon fibers, acrylic fibers, polyethylene fibers, polypropylene fibers, cotton fibers, and others.

The proportion of the PVA-series fiber in the planar paper is preferably 7 to 50 mass %, more preferably 10 to 40 mass %, and further preferably 10 to 30 mass %, provided that the total amount of the planar paper is 100% by mass. If the proportion is lower than 7 mass %, the absolute content of the PVA-series fiber may be too low and inappropriate to form a network structure between fibers. As a result, the adhesive tape comprising such a low amount of PVA-series fibers may fail to attain sufficient property for adhesive tapes. In contrast, the adhesive tape comprising the PVA-series fiber in a proportion of over 50 mass % may have a too high tearing strength, and such adhesive tape deteriorates in hand cutting property and handleability.

If necessary, within the scope of the present invention, the planar paper of the present invention may include a variety of additives commonly used for paper production, for example, a paper strength additive, a wet strength improving agent, a water repellent, a water resistant additive and others.

Further, in view of the ability to smoothly pass through the paper production process and the adhesive tape production process, and further of the handleability required as adhesive tapes, the planar paper of the present invention preferably has a basis weight of 10 to 300 g/m$^2$ and more preferably of 20 to 280 g/m$^2$ and further preferably of 30 to 250 g/m$^2$.

In addition, the planar paper of the present invention is preferably impregnated with a resinous substance. When a planar paper is impregnated with a resinous substance under heating, the surface of the PVA-series fiber in the planar paper is melted and the PVA-series fibers bonded at crossing point to form a network structure between fibers. According to this network structure, the planar paper improves its elongation and strength, and also reduces voids in the paper. As a result, in the post-impregnated treatment, especially the coating treatment of backside-treating agent, release agent, adhesive agent and others, the amount of a coating agent to be coated can be reduced and at the same time, strike through phenomenon of these coating agents can be effectively prevented.

The resinous substance to be impregnated in the planar paper of the present invention is preferably applied in the form of an aqueous solution or aqueous dispersion of the resinous substance in view of environmental consideration. In the case where facilities comprise an processing equipment to avoid leak of organic solvents into air and drainage, the resinous substance may be dissolved in an organic solvent to prepare a solution to be used. The resinous substance may include, for example, elastic polymers such as natural rubbers, styrene-butadiene copolymer rubbers, acrylonitrile-butadiene copolymer rubbers, butyl rubbers, styrene-isoprene-styrene copolymer rubbers, acrylonitrile-butadiene-isoprene copolymer rubbers, styrene-butadiene-styrene copolymer rubbers, methyl methacrylate grafted natural rubbers, styrene grafted natural rubbers, acrylonitrile grafted natural rubbers, synthetic isoprene rubbers, ethylene-acrylic ester copolymer rubbers, butadiene-(meth)acrylic ester copolymer rubbers, ethylene-acrylonitrile copolymer rubbers, liquid isoprene rubbers, liquid butadiene rubbers, liquid styrene-butadiene copolymer rubbers, and liquid acrylonitrile-butadiene copolymer rubbers; polyvinyl alcohol, polyvinyl butyral, polyvinyl acetate, (meth)acrylic ester, vinyl acetate-acrylic ester copolymer, and others.

In addition to the above-mentioned substances, the resinous substance to be impregnated in the planar paper of the present invention may also comprise elastic materials having a functional group such as halogen atoms, chlorosulphonic acid group, carboxyl group, hydroxyl group, amino group, epoxy group, and the like. The examples may include chlorobutyl rubbers, bromobutyl rubbers, chloroprene rubbers, chlorinated polyethylene, chlorosulfonated polyethylene, carboxylic acrylonitrile-butadiene copolymer rubbers, liquid carboxylic polyisoprene rubbers, hydroxy(meth)acrylate, liquid hydroxylated polybutadiene rubbers, copolymer resins comprising (meth)acrylic ester and at least one member selected from the group consisting of (meth)acrylonitrile, (meth)acrylic acid and hydroxy(meth)acrylate, liquid aminated polybutadiene rubbers, epichlorohydrin rubbers, and the like.

When the resinous substance comprises a copolymer, the copolymer used in the resinous substance may be a random copolymer or a block copolymer. The resinous substance can be used singly or in combination. Further, when the resinous substance has an unsaturated double bond in the molecule, the resinous substance may be crosslinked with an alkylphenol formaldehyde resin, or a variety of vulcanizing agents. Such crosslinking improves solvent resistance of the resinous substance. Further, in the case where the elastic materials having a functional group are used as the resinous substance, a variety of crosslinking agents can be used for crosslinking of the crosslinking agent and the functional group. The crosslinking agent may comprise, for example, metal compounds, amino compounds, epoxy compounds, isocyanate compounds, and others. If necessary, the crosslinking agent may be used singly or in combination.

If the planar paper of the present invention is impregnated with the resinous substance, the solid content of the resinous substance in the planar paper is, relative to 100 parts by mass of the planar paper, preferably 10 to 120 parts by mass, and more preferably 20 to 100 parts by mass.

The resinous-substance-impregnated planar paper of the present invention preferably has an breaking elongation, determined in accordance with Japanese Industrial Standard (JIS) P 8113 as shown in FIG. 1, of not lower than 12%, and more preferably of 13 to 20% in order to attain an excellent conformability to rough surfaces. Since a planar paper having a breaking elongation of less than 11% deteriorates in stretching property, and an adhesive tape comprising the planar paper as the backing may easily cause lift or separation when it is adhered to rough surfaces or others.

Figure 2:
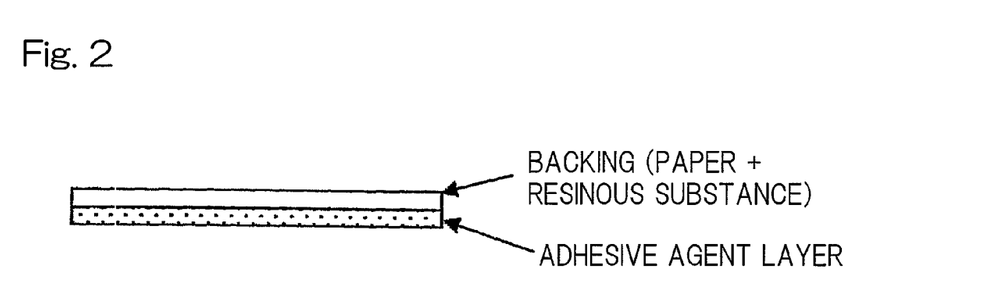
FIG. 2 is a cross-sectional view showing a structure of one embodiment of the adhesive tape of the present invention.

As shown in FIG. 2, the adhesive tape of the present invention can be produced by preparing a resinous-substance-impregnated planar paper as a backing, and coating the surface of the backing with an adhesive agent to form an adhesive agent layer (adhesive layer) on the backing. The production process of the adhesive tape of the present invention is not limited to a specific one, and any process can be used as known in the adhesive tape-making art using a paper as the backing. The coating method of adhesive agents on the surface of the planar paper of the present invention may include, for example, flow expanding method, roll coating, reverse coating, doctor blade coating, bar coating, comma coating, fountain coating, lip coating, and others. Among them, the comma coating or lip coating is preferably employed in order to control the application amount. The thickness of the adhesive layer in the adhesive tape (the thickness of the dried adhesive layer) is preferably 5 to 250 μm, and more preferably 10 to 100 μm.

The adhesive agent to be applied to the resinous-substance-impregnated planar paper of the present invention includes any of organic solvent-based adhesive agents or aqueous adhesive agents. From the viewpoint of avoiding environmental pollution, aqueous adhesive agents in the form of aqueous solution or aqueous dispersion may be employed. In the case where facilities comprise an processing equipment to avoid organic solvents leak into air and drainage, organic solvent-based adhesive agents may be used. The adhesive agent includes any of pressure-sensitive adhesive agent known as the conventional adhesive agents used in the adhesive tape-making art, and comprises one or more elastic polymers such as, for example, natural rubbers, acrylic-based rubbers, synthetic isoprene-based rubbers, polyisobutylene-based rubbers, butylic rubbers, styrene-butadiene copolymer rubbers, styrene-isoprene copolymer rubbers, silicone rubbers, ethylene-propylene copolymer rubbers, ethylene-propylene-diene copolymer rubbers as a base component, and if necessary an additive such as tackifying resins, plasticizers, fillers, crosslinking agents, anti-oxidants is added to the adhesive agent in order to improve or modify the property of the adhesive agents.

Figure 3:
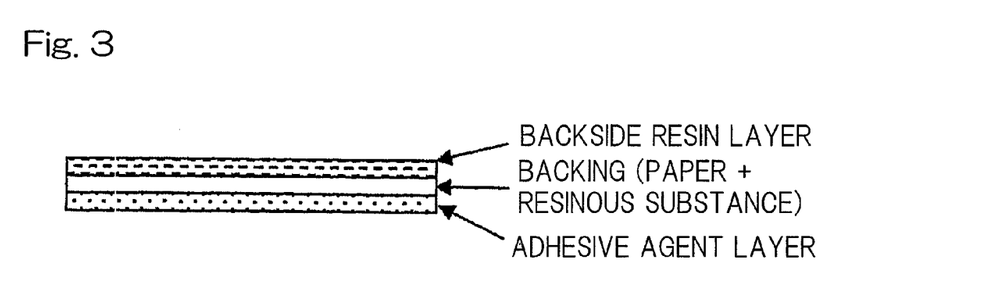
FIG. 3 is a cross-sectional view showing a preferred embodiment of the adhesive tape of the present invention.

If necessary, the adhesive tape of the present invention may comprise, as shown in FIG. 3, a resin layer (a backside resin layer) on the surface of the backing opposite the adhesive-coated layer. The backside resin layer is a layer to avoid impregnation of the adhesive agents or release agents and at the same time to impart a stiffness to some extent to the adhesive tape for releasing the tape from the roll of the adhesive tape at the time of applying the adhesive tape to the surface to be adhered. The resin used for the backside resin layers preferably includes, for example, shellac resins, acrylic ester copolymer resins, PVA resins, polyvinyl butyral resins, polyvinyl acetate resins, vinyl acetate-acrylic ester copolymer resins, copolymer resins of hydroxyl group-containing aliphatic unsaturated hydrocarbons and (meth)acrylonitrile, copolymer resin of at least one member of hydroxy(meth)acrylate, (meth)acrylonitrile and (meth)acrylic acid with (meth)acrylic ester and styrene, copolymer resins of (meth)acrylonitrile and/or (meth)acrylic acid with (meth)acrylic ester, and the like. They are employed singly or in combination.

In the case where the adhesive tapes according to the present invention have a backside resin layer comprising the above-described resin, the amount of the resin to be applied to the backside is preferably 1 to 30 g/m$^2$, and more preferably 2 to 20 g/m$^2$ on the dry mass basis.

Figure 4:
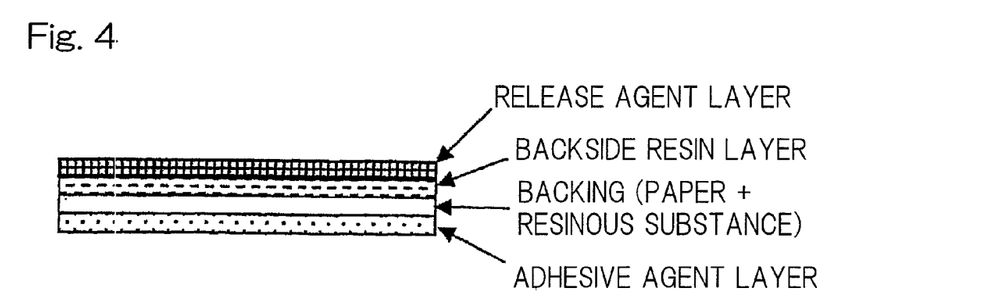
FIG. 4 is a cross-sectional view showing another preferred embodiment of the adhesive tape of the present invention.

Moreover, alternative to the backside resin layer or on the backside resin layer, a may be formed on the backside of the backing as shown in FIG. 4. The release agent layer is effectively used to release or peel the adhesive tape from the adhesive tape roll. The amount of the release agent to be applied is preferably 0.01 to 10 g/m$^2$, and more preferably 0.1 to 5 g/m$^2$ on the dry mass basis.

The release agent to be applied as the release agent layer is not limited to a specific one, and any of release agent conventionally used in the art of adhesive tape can be employed. The release agent may include, for example, the following agents of (1) to (3):

(1) alkyl pendant-series release agents:
  (a) copolymers of stearyl acrylate with acrylic acid, acrylonitrile and/or vinyl acetate,
  (b) copolymers of stearyl acrylamide with acrylic acid and/or acrylonitrile,
  (c) copolymers of stearyl vinyl ether with acrylic acid, maleic anhydride and/or acrylonitrile,
  (d) reaction products of cellulose and/or polyvinyl alcohol with stearoyl chloride, and
  (e) modified resins in which polymers having an active hydrogen such as polyvinyl alcohols, partially acetalized polyvinyl alcohols, cellulose derivatives, and polyesters are modified with an aliphatic isocyanate such as stearyl isocyanate.

(2) Condensed wax-series release agents:
  (a) polyamides, polyesters, or polyurethanes which are a reaction product of behenylaminopropylamine and/or α-monostearate with dicarboxylic acid compounds or polyisocyanate compounds,
  (b) long-chain alkyl group-containing Werner-type metal complexes,
  (c) shellac waxes.

(3) Polyethyleneimine derivatives:
  (a) poly(N-stearoyl ethyleneimine)
  (b) alkylurea derivatives being a reaction product of a polyethyleneimine with an aliphatic isocyanate, for example, $C_{18}H_{37}NCO$.

The adhesive tape of the present invention has a higher elongation and is excellent in stretchability because the resinous-substance-impregnated planar paper used as the backing has a higher elongation and is excellent in stretchability. Accordingly, when the adhesive tape of the present invention is applied to the adherend surface, it is excellent in the elongation property as well as in the conformable feature to rough surfaces or curved lines.

Such adhesive tape of the present invention can be applied, without causing lift or separation, to objects having rough surfaces such as, for example, lysine sprayed exterior walls, asphalt (bitumen), concrete blocks, or objects having complicated curved lines such as, for example, automotives, electrical machinery and apparatus. Also, the present adhesive tape is effectively employed in a variety of applications, for example, for a paint masking, a masking for curing a rough surface, a floor masking, in fixing electronic component parts. In particular, the adhesive tape of the present invention is excellent in adhesive properties due to the flat surface and free from weeping, and therefore, can provide a clearly visible painting line left in a portion of a painted layer when the adhesive tape is removed from such portion of the painted layer. Accordingly, the present adhesive tape is particularly effectively used as a paint masking tape.

Hereinafter, the present invention will be demonstrated by way of some examples that are presented only for the sake of illustration, which are not to be construed as limiting the scope of the present invention. It should be noted that in the following Examples, physical properties of the Examples and Comparative Examples were evaluated in the following manners.

[Saponification Degree and Degree of Polymerization of PVA Constituting the PVA Fiber]
Saponification degree of PVA and degree of polymerization thereof were determined in accordance with JIS K 6726.

[Fiber Breaking Temperature of PVA Fiber in Water (° C.)]
A sample was prepared by fixing a weight of 0.9 gf/500 dtex to one end of PVA fiber tow 5 cm in length, and the sample was hung in 500 ml of water (20° C.). Then, the water was heated at an elevating temperature of 1° C. per minute. The temperature at which the sample fiber was broken by dissolution was determined as a fiber breaking temperature in water.

[Breaking Elongation (%) and Tenacity (cN/dtex) of PVA Fiber]
Breaking elongation (%) and breaking tenacity (cN/dtex) of PVA fiber were determined in accordance with JIS L 1015.

[Tenacity of PVA Fiber at 10% Elongation (cN/dtex)]
Breaking elongation of PVA fiber was obtained in accordance with JIS L 1015, and tenacity of the PVA fiber at 10% elongation was determined from the obtained tenacity-elongation curve.

[Single-Fiber Fineness (dtex) and Fiber Length (mm) of PVA Fiber]
Fineness and fiber length of PVA fiber were determined in accordance with JIS L 1015.

[Basis Weight of Paper (g/m²)]
Basis weight was determined in accordance with "the determination method for basis weight (grammage) per meter of paper" of JIS P 8124.

[Paper Thickness (mm)]
Thickness of the obtained paper was determined by measuring 5 spots separately with PEACOCK Dial-Thickness Gauge H Type (φ10 mm×180 g/cm²) after leaving the paper under a reference atmosphere (20° C.×65% RH) for 4 hours or over.

[Elongation of Resinous-Substance-Impregnated Paper (%)]
Breaking elongation of resinous substance-impregnated paper was measured with a tensile strength of the paper in accordance with "the determination method for tensile property of paper and board" of JIS P 8113, and the obtained breaking elongation of the paper was determined as the elongation of the resinous-substance-impregnated paper.

[Strength of Resinous-Substance-Impregnated Paper at 5% Elongation (N·m/g)]
Tensile strength of paper at 5% elongation was determined in accordance with "the determination method for tensile property of paper and board" of JIS P 8113.

Figure 6:
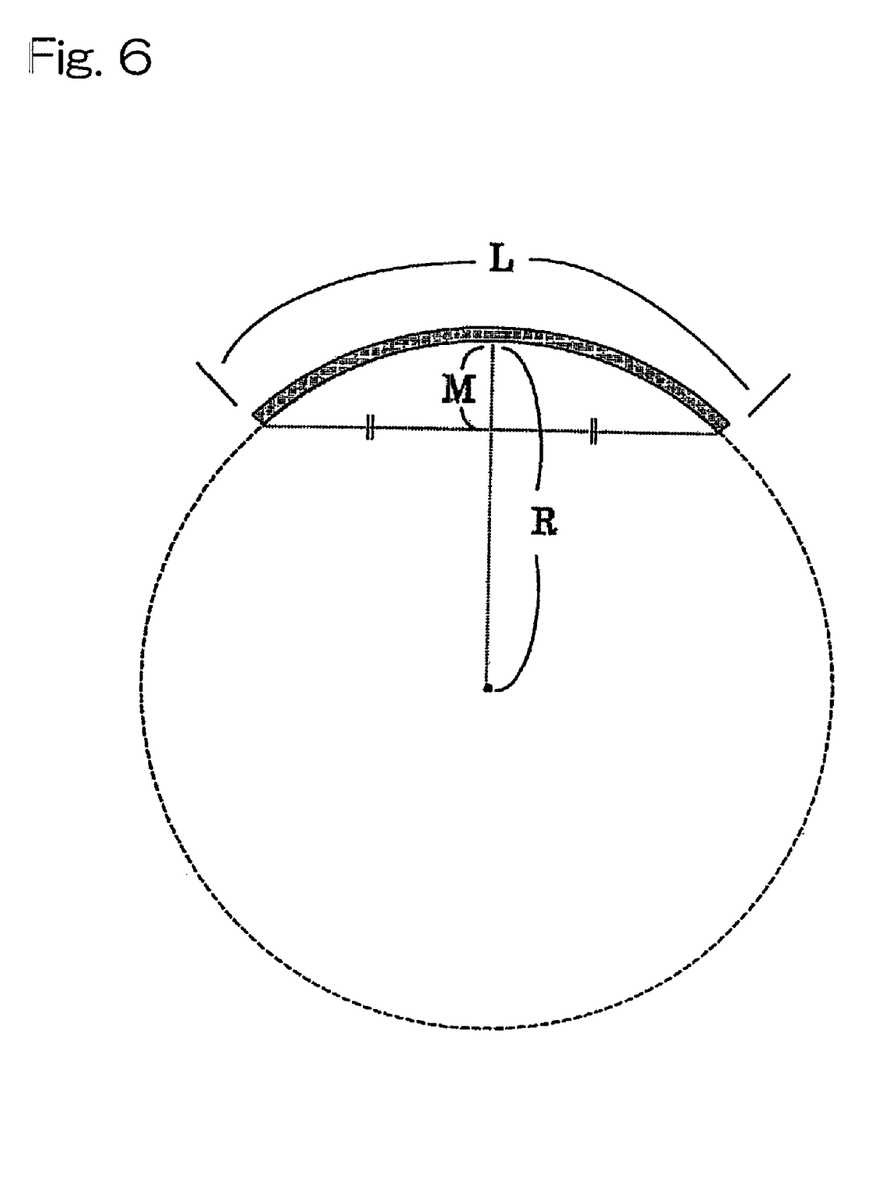
FIG. 6 is a diagram showing a method for evaluating the conformable feature of an adhesive tape.

[Evaluation on Conformability of Adhesive Tape]
Using an adhesive tape of 12 mm in width as a test sample, the test sample was so shaped as to depict an accurate line occupying a portion of the geometric arch, of which radius of curvature is so minimal that no wrinkle may occur in the adhesive tape as shown in FIG. 6. After the test sample had been so curved as to depict the arch, numerical values of respective sites (L and M as will be described later), which are required for calculation, were measured and the radius (R: cm) of the curvature of the arch depicted by the test sample was calculated using the following equation.

If the arch of 50 cm or smaller in radius (R) can be depicted without wrinkles being formed in the test sample, it is determined that the adhesive tape in question has a good conformability.

$$M=R[1-\cos(L/2R)]$$

wherein L represents the length (cm) of the curvature of the test sample along the circle of the radius (R) and M represents the distance (cm) from the point intermediate of the chord of the arch of the length (L) measured to the arch in a direction orthogonal to the chord.

[Sharpness of Painting Line Formed by Adhesive Tape]
Using an adhesive tape of 12 mm in width and 200 mm in length as a test sample, the test sample was applied to an iron plate so as to extend straight and a lacquer (manufactured by and available from Asahipen Corporation under the trade name of "Asahipen Lacquer Spray (Black)" was sprayed onto the iron plate, including the test sample applied thereto, in two double passes each pass consisting of a five-second run. After the lacquer had been dried, the test sample was peeled off from the iron plate and, using a microscope (manufactured by and available from Keyence Corporation, Japan), the presence or absence of exudations of the lacquer paint was examined with the test sample magnified 40× to determine the length of those exudations. When the length of the exudations was 0.5 mm or smaller, an evaluation of "good" was given, whereas when the length of the exudations was in excess of 0.5 mm, an evaluation of "poor" was given.

[Hand Cutting Property of Adhesive Tape]

The hand cutting property of the adhesive tape was measured in accord with the single tong method stipulated in JIS L 1906 in terms of the tear strength in a transverse direction. The test sample that could be easily torn by hand with no knife precut left therein was rated as "good", whereas the test sample that was hard to cut without a knife precut left therein (i.e., the test sample having a tear strength in excess of 150 g) was rated "poor".

Example 1

(1) An aqueous solution of 15 mass % PVA resin having an average degree of polymerization of 1,700 and a saponification degree of 99.0 mol % was extruded from spinneret having 4,000 holes at an extrusion rate of 0.020 cc/min into a coagulation bath of a saturated aqueous solution of sodium sulfate, and the formed filaments were taken up with a first roller, and subjected to wet hot-drawing at a draw ratio of 4 times. The drawn filaments were dried at 130° C., then subjected to dry heat treatment at 230° C. with keeping the length of the filaments (draw ratio of 1 time) to give a PVA fiber having a single-fiber fineness of 1.2 dtex, a breaking tenacity of 3.7 cN/dtex, a tenacity at 10% elongation of 2.1 cN/dtex, a breaking elongation of 28%, and a fiber breaking temperature in water of 96° C.

(2) The PVA fiber obtained in the above (1) process was cut to the fiber length of 6 mm, and 20 parts by mass of the cut fiber and 80 parts by mass of softwood pulp (average fiber length of 2.5 mm) were added to water. This aqueous mixture was mixed in a pulper to prepare a paper making stock suspension having a total concentration of PVA fiber and softwood pulp of 0.5 mass %, and this suspension was fed to a suction former for wet paper-making to produce a wet-laid paper, followed by drying with a Yankee dryer having a surface temperature of 110° C. Then this wet-laid paper was removed from the Yankee dryer to produce a planar paper having a basis weight of 30 g/m².

(3) Into the paper obtained in the above (2) process, was impregnated an emulsion of an acrylic ester polymer (manufactured by and available from Shin-Nakamura Chemical Co., Ltd., trade name of "New coat SFK-1000A") at a proportion of 100 parts by mass relative to the planar paper, then the resinous-substance-impregnated paper was dried at 150° C. with a air-through drier. To one surface of the dried material, was applied a rubber-based solvent type adhesive which was a mixture of 100 parts by mass of an ethyl acetate solution of 30 mass % of a copolymer obtained by copolymerization of 70.0 mass % of n-butylacrylate, 20.0 mass % of 2-ethylhexylacrylate, 9.7 mass % of acrylic acid and 0.3 mass % of 2-hydroxyethylacrylate, with 1.0 part by mass of an isocyanate-series crosslinking agent (manufactured by and available from Nippon Polyurethane Industry Co., Ltd., under the trade name of "Coronate L-55E") to produce an adhesive tape, as shown in FIG. 2, comprising an adhesive layer at an application quantity (dried quantity) of 20 g/m².

(4) The adhesive tape obtained from the above (3) process was visually observed by dyeing the part of the PVA fiber with iodine, and found that only the surface of the PVA fiber in the adhesive tape had melted and to form a network structure between fibers. The adhesive tape had a breaking elongation of 15%, and was excellent in elongation property because of network structure in the tape as well as higher elongation of the fiber itself constituting the network structure. Further, the evaluation of the conformable feature of the adhesive tape revealed that the adhesive tape could accurately conform to curved lines, and provided a clear painting line left in a portion of a painting when the adhesive tape is removed from such portion of the painting. Furthermore, the evaluation of hand cutting property indicating handleability in adhesion with the tape revealed that the adhesive tape could be easily torn by hand in the traverse direction without causing any stub. The results are shown in Table 1.

Example 2

A planar paper and an adhesive tape were obtained and evaluated in the same way with those of Example 1 except that the extrusion rate from the spinneret holes in the spinning process was changed into 0.032 cc/min, and that the heat treatment temperature and draw ratio in dry heat process were changed into 230° C. and 1.5 times, respectively. The results are shown in Table 1.

Example 3

A planar paper and an adhesive tape were obtained and evaluated in the same way with those of Example 1 except that the extrusion rate from the spinneret holes in the spinning process was changed into 0.038 cc/min. The results are shown in Table 1.

Example 4

A planar paper and an adhesive tape were obtained and evaluated in the same way with those of Example 1 except that the PVA fiber obtained in Example 1 was subjected to acetalization with an aqueous solution of 2.5 mass % of formaldehyde and 25.0 mass % of sulfuric acid. The results are shown in Table 1.

Example 5

A planar paper and an adhesive tape were obtained and evaluated in the same way with those of Example 1 except that the PVA fiber obtained in Example 1 was crosslinked in an aqueous solution of 0.5 mass % of tetramethoxynonane, 0.1 mass % of dodecylbenzenesulfonic acid, and 0.05 mass % of sulfuric acid. The results are shown in Table 1.

Comparative Example 1

(1) An aqueous solution of 15 mass % PVA resin having an average degree of polymerization of 1700, and a saponification degree of 99.9 mol % was extruded from spinneret having 4,000 holes at an extrusion rate of 0.043 cc/min into a coagulation bath of a saturated aqueous solution of sodium sulfate, and the formed filaments were taken up with a first roller, and subjected to wet hot-drawing at a draw ratio of 4 times. The drawn filaments were dried at 130° C., then subjected to dry heat treatment at 230° C. at a draw ratio of 2 times to give a PVA fiber having a single-fiber fineness of 1.3 dtex, a breaking elongation of 15%, a breaking tenacity of 5.8 cN/dtex, and a fiber breaking temperature in water of 97° C.

(2) The PVA fiber obtained in the above (1) process was cut to the fiber length of 6 mm, and 20 parts by mass of the cut fiber and 80 parts by mass of softwood pulp (average fiber length of 2.5 mm) were added to water. This aqueous mixture was mixed in a pulper to prepare a paper making stock suspension having a total concentration of PVA fiber and softwood pulp of 0.5 mass %, and this suspension was fed to a suction former for wet paper-making to produce a wet-laid paper, followed by drying with a Yankee dryer having a surface temperature of 110° C. Then this wet-laid paper was removed from the Yankee dryer to produce a planar paper having a basis weight of 30 g/m².

(3) Into the paper obtained in the above (2) process, was impregnated an emulsion of an acrylic ester polymer (manufactured by and available from Shin-Nakamura Chemical Co., Ltd., under the trade name of "New coat SFK-1000A") at a proportion of 100 parts by mass relative to the planar paper, then resinous-substance-impregnated paper was dried at 150° C. with an air-through drier. To one surface of the dried material, was applied a rubber-based solvent type adhesive which was a mixture of 100 parts by mass of an ethyl acetate solution of 30 mass % of a copolymer obtained by copolymerization of 70.0 mass % of n-butylacrylate, 20.0 mass % of 2-ethylhexylacrylate, 9.7 mass % of acrylic acid and 0.3 mass % of 2-hydroxyethylacrylate, with 1.0 part by mass of an isocyanate-series crosslinking agent (manufactured by and available from Nippon Polyurethane Industry Co., Ltd., under the trade name of "Coronate L-55E") to produce an adhesive tape, as shown in FIG. 2, comprising an adhesive layer at an application quantity (dried quantity) of 20 g/m².

(4) The adhesive tape obtained from the above (3) process had a breaking elongation of 11%, and was deteriorated in the conformable feature because the adhesive tape could not conform to curved lines having a required radical. The results are shown in Table 2.

Comparative Example 2

An aqueous solution of 15 mass % PVA resin having an average degree of polymerization of 1700, and a saponification degree of 99.9 mol % was extruded from spinneret having 4,000 holes into a coagulation bath of a saturated aqueous solution of sodium sulfate, and the formed filaments were taken up with a first roller, and subjected to wet hot-drawing at a draw ratio of 4 times. The drawn filaments were subjected to dry heat treatment at 130° C. to give a PVA fiber having a single-fiber fineness of 2.9 dtex, a breaking elongation of 58%, a breaking tenacity of 3.7 cN/dtex, a tenacity at 10% elongation of 0.8 cN/dtex, and a fiber breaking temperature in water of 84° C.

With thus obtained PVA fiber, a planar paper and an adhesive tape were produced in the same way with those of Example 1.

The resultant adhesive tape could not retain the morphology of the PVA fiber structure by heat of the wet heat treatment because the fiber had a low fiber breaking temperature in water of 84° C. Further, the adhesive tape had a low breaking elongation of 5%, and deteriorated in conformable feature to the curve. The results are shown in Table 2.

Comparative Example 3

(1) An aqueous solution of 15 mass % PVA resin having an average degree of polymerization of 1,700, and a saponification degree of 99.9 mol % was extruded from spinneret having 4,000 holes at an extrusion rate of 0.043 cc/min into a coagulation bath of a saturated aqueous solution of sodium sulfate, and the formed filaments were taken up with a first roller, and subjected to wet hot-drawing at a draw ratio of 4 times. The drawn filaments were subjected to dry heat treatment at 130° C., and then dry hot-drawing at 230° C. at a draw ratio of 2 times, followed by acetalization with an aqueous solution of 5 mass % of formaldehyde and 10 mass % of sulfuric acid, to give a PVA fiber having a single-fiber fineness of 1.3 dtex, a breaking elongation of 15%, a breaking tenacity of 5.6 cN/dtex, and a fiber breaking temperature in water of 140° C.

With thus obtained PVA fiber, a planar paper and an adhesive tape were produced in the same way with those of Example 1. The resultant adhesive tape had a low breaking elongation of 9% and deteriorated in conformable feature to curved lines because the constituting PVA fiber had a low elongation of 15% and a spot bonding at crossing point between fibers was not formed due to a high fiber breaking temperature in water. Further, due to the reduced stress concentration at tearing, the tape was insufficient in hand cutting property. The results are shown in Table 2.

Comparative Example 4

A planar paper and an adhesive tape were obtained and evaluated in the same way with those of Example 1, except that the PVA fiber obtained in Example 1 was crosslinked in an aqueous solution of 1.0 mass % of tetramethoxynonane, 0.1 mass % of dodecylbenzenesulfonic acid, and 0.1 mass % of sulfuric acid. The results are shown in Table 1.

The resultant adhesive tape had a low breaking elongation of 10% and deteriorated in conformable feature to curved lines because the constituting PVA fibers could not bond with each other due to a high fiber breaking temperature in water of 145° C. Further, due to the reduced stress concentration at tearing, the tape was insufficient in hand cutting property. The results are shown in Table 2.

Comparative Example 5

A planar paper and an adhesive tape were produced in the same way with those of Example 1, except that the proportion of the PVA fiber and the softwood pulp (average fiber length of 2.5 mm) in the paper making stock suspension was changed into 0 part by mass of the PVA fiber and 100 parts by mass of the softwood pulp.

The resultant adhesive tape had a low breaking elongation of 8% and deteriorated in conformable feature to curved lines because the adhesive tape constituted of only natural pulps. The results are shown in Table 2.

Comparative Example 6

(1) The paper making stock suspension prepared in Comparative Example 5 was fed to a suction former for wet paper-making to produce a wet-laid paper. The wet-laid paper was detached from the suction former with a doctor knife attached to a press roller to impart a wet crepe, followed by drying with a Yankee dryer having a surface temperature of 110° C. Then this wet-laid paper was removed from the Yankee dryer and dry crepes were imparted with the doctor knife to produce a crepe paper having a basis weight of 30 g/m².

(2) With the crepe paper obtained in the above (1) process, an adhesive tape was produced in the same way with those of Example 1. The resultant adhesive tape was excellent in conformable feature, but when the crepe tape was removed from a portion of a painted layer, wrinkles in the crepe paper surface caused weeping of the painting, and could not provide a clear painting line left in the portion of the painted layer. The results are shown in Table 2.

TABLE 1

|  |  | Ex. 1 | Ex. 2 | Ex. 3 | Ex. 4 | Ex. 5 |
|---|---|---|---|---|---|---|
| PVA fiber | Tenacity at 10% elongation (cN/dtex) | 2.1 | 3.0 | 0.9 | 2.0 | 1.9 |
|  | Tenacity (cN/dtex) | 3.7 | 5.7 | 3.7 | 3.6 | 3.3 |
|  | Elongation (%) | 28 | 18 | 52 | 31 | 34 |
|  | Fiber breaking temperature of PVA fiber in water (° C.) | 96 | 94 | 99 | 108 | 123 |
|  | Single-fiber fineness (dtex) | 1.2 | 1.3 | 2.9 | 1.1 | 1.2 |
|  | Fiber length (mm) | 6 | 6 | 6 | 6 | 6 |
| Planar paper composition | PVA fiber (part by mass) | 20 | 20 | 20 | 20 | 20 |
|  | Pulp fiber (part by mass) | 80 | 80 | 80 | 80 | 80 |
| Resin used for impregnation | Acrylic resin (part by mass relative to planar paper) | 100 | 100 | 100 | 100 | 100 |
| Resinous-substance-impregnated paper | Elongation (%) | 15 | 13 | 12 | 13 | 12 |
|  | Strength at 5% elongation (N·m/g) | 11 | 14 | 14 | 13 | 13 |
| Evaluation of adhesive tape | Conformability (Minimum circle radius; cm) | 38.8 | 41.6 | 45.7 | 41.1 | 45.3 |
|  | Sharpness of Paint Line Marking (weeping; mm) | ≦0.5 | ≦0.5 | ≦0.5 | ≦0.5 | ≦0.5 |
|  | Hand Cutting Property (tear strength; g) | 130 | 140 | 120 | 140 | 130 |
|  | Comprehensive evaluation | Good | Good | Good | Good | Good |

TABLE 2

|  |  | Com Ex. 1*1 | Com Ex. 2*2 | Com Ex. 3*3 | Com Ex. 4 | Com Ex. 5 | Com Ex. 6*4 |
|---|---|---|---|---|---|---|---|
| PVA fiber | Tenacity at 10% elongation (cN/dtex) | 3.8 | 0.8 | 3.9 | 2.2 | — | — |
|  | Tenacity (cN/dtex) | 5.8 | 3.7 | 5.6 | 3.5 | — | — |
|  | Elongation (%) | 15 | 58 | 15 | 28 | — | — |
|  | Fiber breaking temperature of PVA fiber in water (° C.) | 97 | 84 | 140 | 145 | — | — |
|  | Single-fiber fineness (dtex) | 1.3 | 2.9 | 1.3 | 1.2 | — | — |
|  | Fiber length (mm) | 6 | 6 | 6 | 6 | — | — |
| Planar paper composition | PVA fiber (part by mass) | 20 | 20 | 20 | 20 | 0 | 0 |
|  | Pulp fiber (part by mass) | 80 | 80 | 80 | 80 | 100 | 100 |
| Resin used for impregnation | Acrylic resin (part by mass relative to planar paper) | 100 | 100 | 100 | 100 | 100 | 100 |
| Resinous-substance-impregnated paper | Elongation (%) | 11 | 5 | 9 | 10 | 8 | 15 |
|  | Strength at 5% elongation (N·m/g) | 17 | 23 | 19 | 18 | 18 | 9 |
| Evaluation of adhesive tape | Conformability (Minimum circle radius; cm) | 51.2 | 132 | 59.8 | 85.6 | 70.1 | 37.5 |
|  | Sharpness of Paint Line Marking (weeping; mm) | ≦0.5 | ≦0.5 | ≦0.5 | ≦0.5 | ≦0.5 | 0.8 |
|  | Hand Cutting Property (tear strength; g) | 160 | 80 | 170 | 120 | 77 | 79 |
|  | Comprehensive evaluation | Poor | Poor | Poor | Poor | Poor | Poor |

*1 to *3 VPB102 (Com. Ex. 1), VPB 101 (Com. Ex. 2) and VPB103 (Com. Ex. 3) produced by Kuraray Co., Ltd. were used.
*4 A crepe paper was used.

Figure 5:
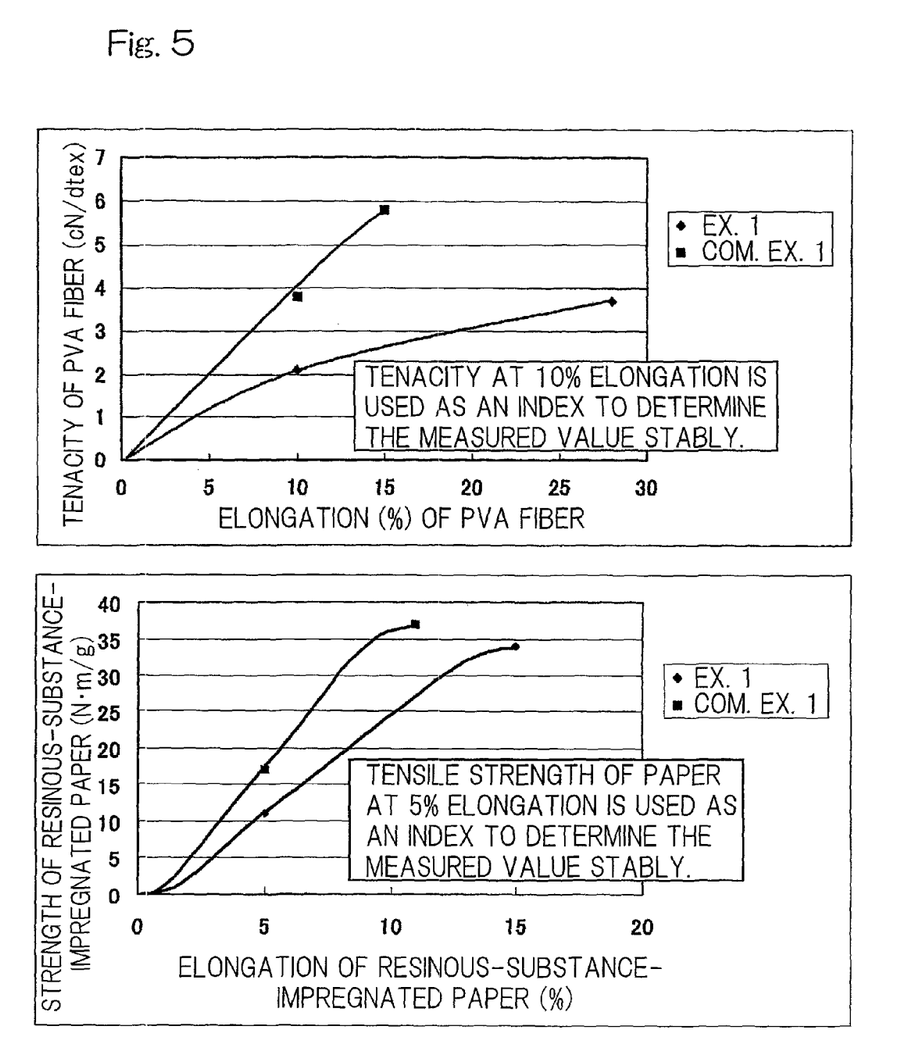
FIG. 5 is a graph (S-S curve) showing properties of the PVA fibers and the resinous-substance-impregnated papers comprising the PVA fibers (in Example 1 and Comparative Example 1)

As shown in FIG. 5, comparison of, for example, Example 1 with Comparative Example 1 revealed that when the PVA fiber itself has a higher elongation, or a higher stretchability under a lower stress, the resinous-substance-impregnated paper comprising the PVA fiber itself has also a higher elongation, or a higher elongation under a lower stress. Accordingly, the resulting adhesive tape can be user-friendly used.

INDUSTRIAL APPLICABILITY

The present invention can provide a resinous-substance-impregnated planar paper for an adhesive tape, and an adhesive tape utilizing such planar paper as a backing, which has an elongation sufficient to allow the adhesive tape to be favorably adhered to an adherend surface without being accompanied by any lift and separation, but with consistently conforming to the curved line area and/or the rough surface area in such adherend surface when such adhesive tape is used as a paint masking or a masking for curing a rough surface, in fixing electronic component parts or in any other application. The adhesive tape is also capable of providing a clear painting line left in a portion of a painted layer, as required in automobiles, when the adhesive tape is removed from such portion of the painted layer. The adhesive tape is further capable of being easily cut by hand without requiring any tool such as, for example, a blade, and excellent in handleability.

What is claimed is:

1. A resinous-substance-impregnated planar paper comprising a polyvinyl alcohol-series fiber having a fiber breaking temperature in water of 92 to 125° C., a tenacity of 0.5 to 3.5 cN/dtex at 10% elongation, and a breaking elongation of 17 to 60%.

2. The planar paper as claimed in claim 1, wherein the polyvinyl alcohol-series fiber has a single-fiber fineness of 0.5 to 3.0 dtex, a fiber length of 2.5 to 12.0 mm, and a breaking tenacity of 2 to 7 cN/dtex.

3. The planar paper as claimed in claim 1, comprising the polyvinyl alcohol-series fiber extruded from a spinneret hole at an extrusion rate of 0.015 to 0.040 cc/min for fiber formation, and followed by dry hot-drawing at a draw ratio of 1.0 to 1.5 times.

4. The planar paper as claimed in claim 3, wherein the polyvinyl alcohol-series fiber is obtained by extruding an aqueous spinning solution through the spinneret hole.

5. The planar paper as claimed in claim 1, wherein the planar paper comprises the above-mentioned polyvinyl alcohol-series fiber at a proportion of 7 to 50 mass % relative to 100 mass % of the planar paper.

6. The planar paper as claimed in claim 1, wherein the planar paper comprises a natural pulp blended as a subject fiber with the polyvinyl alcohol-series fiber.

7. An adhesive tape comprising a backing, the backing comprising the planar paper recited in claim 1.

8. A polyvinyl alcohol-series fiber having a fiber breaking temperature in water of 92 to 125° C., a tenacity of 0.5 to 3.5 cN/dtex at 10% elongation, and a breaking elongation of 17 to 60%.

* * * * *